United States Patent
Smith et al.

(10) Patent No.: US 6,189,901 B1
(45) Date of Patent: Feb. 20, 2001

(54) COMPACT, TRAILING, AUXILIARY AXLE SYSTEM

(75) Inventors: Fred P. Smith, Alpine; Larry Larcom, Pleasant Grove, both of UT (US)

(73) Assignee: F. S. New Products Inc., Alpine, UT (US)

( * ) Notice: Under 35 U.S.C. 154(b), the term of this patent shall be extended for 0 days.

(21) Appl. No.: 09/080,087

(22) Filed: May 15, 1998

(51) Int. Cl.[7] .................................................. B62D 61/12
(52) U.S. Cl. ..................... 280/86.5; 180/209; 280/43.17; 280/405.1
(58) Field of Search ............................... 280/86.5, 405.1, 280/407, 43, 43.17, 149.2, 124.157, 81.1, 81.6; 180/24.02, 209

(56) References Cited

U.S. PATENT DOCUMENTS

| | | | |
|---|---|---|---|
| 3,752,496 | * 8/1973 | Meinecke, Jr. ........................ | 280/81.1 |
| 4,063,779 | * 12/1977 | Martin et al. ......................... | 298/22 P |
| 4,084,833 | * 4/1978 | Mohrbacker et al. ............... | 280/81.6 |
| 4,195,856 | 4/1980 | Larson et al. ......................... | 280/81 |
| 4,204,697 | 5/1980 | Santerre ................................ | 280/80 |
| 4,314,709 | * 2/1982 | Silbernagel ........................... | 280/81.6 |
| 4,421,331 | 12/1983 | Ferris .................................... | 280/81 |
| 4,684,142 | 8/1987 | Christenson ........................... | 280/81 |
| 4,705,133 | 11/1987 | Christenson et al. ................. | 180/209 |
| 4,762,421 | 8/1988 | Christenson et al. ................. | 366/54 |
| 4,848,783 | 7/1989 | Christenson et al. .............. | 280/405.1 |
| 5,018,593 | * 5/1991 | Hermann ............................ | 180/24.02 |
| 5,090,495 | 2/1992 | Christenson ....................... | 180/24.02 |
| 5,149,126 | * 9/1992 | Brennan ............................... | 280/86.5 |
| 5,370,196 | 12/1994 | Bishop ............................... | 180/24.02 |
| 5,458,355 | 10/1995 | Young ................................ | 280/405.1 |
| 5,498,021 | 3/1996 | Christenson ......................... | 280/704 |
| 5,516,135 | * 5/1996 | Christenson ....................... | 280/405.1 |
| 5,540,454 | * 7/1996 | VanDenber et al. ................. | 280/81.1 |
| 5,549,322 | * 8/1996 | Hauri ................................... | 280/86.5 |
| 5,597,174 | 1/1997 | Christenson et al. ................. | 280/704 |
| 5,713,424 | 2/1998 | Christenson ....................... | 180/24.02 |
| 5,718,443 | 2/1998 | St. Onge ........................... | 280/405.1 |
| 5,823,629 | * 10/1998 | Smith et al. ....................... | 298/23 R |
| 5,897,123 | * 4/1999 | Cherney et al. .................... | 280/86.5 |

* cited by examiner

*Primary Examiner*—J. J. Swann
*Assistant Examiner*—David R. Dunn
(74) *Attorney, Agent, or Firm*—Pate Pierce & Baird

(57) ABSTRACT

A compact, trailing, auxiliary axle system is attached to a truck for carrying additional weight and distributing the weight of the truck over a greater number of axles and a greater maximum total distance of distribution of those axles. The apparatus is attached high, and may be secured to the body of a truck, such as a refuse truck, reducing the total length of extension from the rear of the truck, yet pivoting from a comparatively high position for easy stowage above the bubble or bulkhead protruding from the tailgate of a truck. Hydraulic actuation relies on pulling, during deployment, providing improved resistance to buckling, protection from road damage, with short coupling for improved strength of booms, hydraulics, and cross members. Conduits may carry control and power through the frame of the assembly, and conventional suspension components may be used. A "broken" frame design provides easy attachment for suspension systems, length within legal regulatory limits, leverage against the load presented by the truck, durable structures, and straightforward manufacturing processes with rapid alignment and assembly. The overall envelope is only minimally affected for the truck body, during operation and transit, while operational clearances are respected in all directions with respect to the body.

21 Claims, 9 Drawing Sheets

COMPACT, TRAILING, AUXILIARY AXLE SYSTEM

BACKGROUND

1. The Field of the Invention

This invention relates to vehicle equipment, and, more particularly, to auxiliary trailing axles for trucks.

2. The Background Art

Highway construction and maintenance is a matter of substantial concern to local, state, and federal governments. Road construction has always been an expensive proposition. Roads constructed using modern knowledge, methods, and technology have greatly improved the load-bearing capacity of vehicles traveling over those roads.

Specific limitations exist on loading of axles. It is well established that bridges are designed to carry specific weights. However, in actual bridge design, several additional, localized factors exist. For example, a bridge may have a surfacing material such as concrete or asphalt. These may be designed in various compositions to support various loads and provide predictable durability. However, underlying a bridge or road surface is a structure of specific members each designed for supporting a particular maximum force or load.

Bridges in various parts of a roadway system have varying weight-carrying capacities. A truck having weight over some number of axles, must also have those axles distributed across a suitable length of the bridge in order to distribute the load of the truck properly over individual structural members of the bridge.

Thinking in terms of a truck, not as a truck, but as a series of axles, each bearing a load, one sees another important factor in the mutual design criteria between vehicles and roadways (e.g. bridges). That is, axles cannot be separated from the truck. The truck has a length; therefore, axles cannot be completely separated from each other. Therefore, all of the axles of the truck will pass over the bridge together. The truck has to distribute axles with some maximum length.

Moreover, road construction does leave all streets, highways, roads, and the like with specific limitations on sustainable loads and the like. For example, just as building construction must start far below the surface level of the earth in order to support a foundation, a road bed is deeply laid for many roads. Above a road bed are laid various types and grades of materials. Ultimately, a surface material is provided on which vehicles roll directly.

A fundamental engineering principal is involved in the concept of maximum stress and principal stress directions. In solid materials of uniform, isotropic, properties, principal stresses are compression tension, and shear. At any location, principal stresses may be axial or may be resolved axially. Accordingly, once stresses have been resolved along orthogonal axes, all loads may be represented as either tension or compression. However, in a material subjected to any combination of tension, compression, or both, along principal axes, shear stress is induced at an angle with respect to the principal stresses.

Therefore, many years of stress analysis have developed by reliance on a host of methods. Nevertheless, in terms of understanding the principal stress planes, Mohr's circle is an engineering construct useful for explaining the directions and magnitudes of principal stresses.

In accordance with these concepts of principal stresses, as known in the art, certain design approaches may be used to minimize stress or support stress as needed. One important principal is St. Venant's principal. St. Venant's principal may be thought of in terms of principal stress. Accordingly, whenever stress is localized, by a load on a solid structure, the load will be distributed on an angle corresponding to the angle of the principal shear planes.

Therefore, one may think of a road bed as a pile of rocks of varying sizes and qualities. Nevertheless, each individual particle in a road bed or a road surface material experiences stress from a load according to its comparative distance from the point of application of the load. Therefore, as a practical matter, treating the load as a major force component on the road, and assuming isotropic properties, one may imagine loads being distributed at an angle of 45 degrees away from the direct or normal load applied to a road surface. Accordingly, two feet below a road surface, a load may be distributed two feet away from the point of application of the load in each horizontal direction, assuming that the load is normal to the surface. In reality, road materials are not solid. Thus, each particular solid particle is, or may be, heavily, locally loaded.

Also, competing considerations exist in road construction. For example, a layer of aggregate does not support tension. It only supports compression. However, rocks neighboring a loaded rock can restrain the loaded rock from moving. Thus, the concept of principal stress is a useful concept in understanding the damage that may be done to a road.

One reason why trucks, cars, and vehicles in general rely on pneumatic tires is to improve the ability of the vehicle to absorb shocks from the roughness of a surface. Nevertheless, another purpose of rubber tires is to distribute the load of the vehicle over a surface area of a road surfacing material. Tire pressures relate directly to the distortion of a tire in order to present a certain amount of area onto a road for supporting the weight of the vehicle.

For example, a four thousand pound vehicle having a total of fifty square inches of tire surface to the road must have a tire pressure of approximately twenty pounds per square inch in order to support the load. To support the same load or weight of a vehicle at forty pounds per square inch only twenty-five square inches of tire tread must be in contact with the road. Thus, local pressure on a road surface may be controlled, to a certain extent, by the inherit limits on tire pressures.

However, further down through a road bed away from a tire running on a road surface, the total force of a tire has been integrated by St. Venant's principal. One may note that two axles, close together will produce more load in a road bed than the same two axles, carrying the same two loads, but spaced a substantial difference apart, with respect to the thickness of the road bed.

Thus, one may see that axle location may be very important, as is the net, local force presented on a bridge or a road bed by an axle. In this context, an axle may be used to refer to the axle itself, or to the axle and tires as they represent force application to a road bed from a vehicle supported thereby.

Trucks today may be manufactured to have tandem axles spaced a comparatively long distance apart, as compared with trucks of previous years. Also, trucks now carry auxiliary axles that can be engaged for distributing a load along a different length of the truck. For example, long truck bodies or trailers may have wheels located nearer the front end, rather than leaving the entire weight distributed between a front axle and a rear axle or between a tractor and a pair of closely spaced tandem axles at the rear.

Auxiliary axles are added to concrete mixer trucks to accommodate limitations on bridge weights. Also, auxiliary axles may be added to accommodate the large differential load between an empty truck and a loaded truck. Thus, auxiliary axles may be engaged for a limited time, only while a vehicle is loaded and is traveling on a road. At a work site, a truck may not need auxiliary axles as a support for the vehicle itself, and may disengage them.

Thus, heavily loaded trucks having changes in load actually applied thereto, may need auxiliary axles. Those axles need to be distributed along a maximum length, and may need to be distributed along the vehicle itself To protect roadways, to satisfy bridge weight limitations, and to support substantial loads, auxiliary axles may be used in vehicle construction.

Auxiliary axles themselves present various problems. One may think of the problems as difficulties that auxiliary axles do not solve. In some instances auxiliary axles introduce new problems of their own to vehicle construction, legal compliance of vehicles with road and bridge limits, or with operation of a vehicle in transit or on a job for which the vehicle is designed.

For example, trailing axles have been added to concrete mixer trucks and dump trucks. Auxiliary axles sometimes drop down from in front of our behind the main, tandem or single, rear, load-bearing axles. In some applications, trucks may be fitted with trailing axles that extend behind the main body of a truck. Brackets may be fitted to a frame in order to carry arms or booms that hydraulically actuate in order to lift or drop an axle for service.

In some instances, some concrete mixer trucks draw a separate frame, hinged as a trailer, and yet being permanently attached to the main frame of the truck. Thus, the net length of the rigid frame is shortened, while the engine, even if it drives the vehicle running gear itself, is off-loaded away from the main load.

Some trucks require a short turning radius, due to their operation. For example, refuse trucks may use add-on or auxiliary axles in various configurations. However, they typically are positioned directly in front of or behind the main load-bearing axles at the rear of the vehicle. Even trailing axles as disclosed in U.S. patent application Ser. No. 08/893,600, incorporated herein by reference, introduced a host of difficulties that are not presently tractable for certain trucks.

For example, refuse truck bodies contain large forces due to the compression mechanisms that compress the refuse stored therein. Tailgates and bodies of refuse trucks often have a circular configuration when viewed longitudinally in cross-section. Moreover, and more importantly, when viewed laterally or transversely (orthogonally to a longitudinal direction), a refuse truck tailgate may actually have a bubble. In cross-section, a bubble may be a portion of a circle, whether or not it is a sphere (semi-sphere). The resulting curvature reduces bending stress at the joint (e.g. between the tailgate, end cap, or "bubble", and the frame holding the bubble). The frame effects fastening of the tailgate containing the bubble to the main body or containment vessel of the truck.

Pressure vessels like the tailgate are round for a reason. The material is generally loaded in tension reducing the need for additional stiffeners. Accordingly, reduced stress may be provided by a semi-cylindrical, semi-spherical shape (a "bubble") in order to accommodate loads at minimum stress.

However, the bubble typically extends beyond the frame of the vehicle. Extending beyond a frame of a vehicle presents several problems. One problem is that a structure placed behind the vehicle as a load-bearing auxiliary axle and mounting assembly must accommodate the envelope of the vehicle body. On the one hand, length may be good for distributing load away from the other load-bearing axles of a vehicle. On the other hand, length cannot exceed length limits that exist for various licensing and regulatory limitations of vehicles.

Likewise, trucks are manufactured in specific shapes for performing certain functions. To the extent that an auxiliary axle interferes with the operation of truck, the auxiliary axle must be removed as an obstruction to operation, while being deployable for road transit. In certain embodiments, an auxiliary axle may be lifted or pivoted to remove wheels or supporting frame structures away from a tailgate of a vehicle, such as a truck. In such embodiments, the very length that may provide a distribution wheelbase for a load becomes a clearance problem in altitude, width, or other operational clearance.

The hydraulic mechanisms for deploying and supporting auxiliary axles may be problematic. Hydraulic actuation is not designed for supporting the loads and the frequency of cycling loads that can be expected in a suspension system of a truck. Hydraulic loading mechanisms make very poor structures for primary suspension systems on auxiliary axles.

What is needed is a new system of auxiliary axles for installation on heavy trucks, such as dump trucks, concrete mixer trucks, and especially for refuse trucks. Refuse trucks specifically need a very short coupling for the envelope of the auxiliary axle when stored (stowed) in a non-load-bearing configuration. By the same token, a refuse truck needs castering wheels extended a maximum distance, within the length limits permissible, away from the tailgate of a truck.

Likewise, a refuse truck needs to use an auxiliary axle that will accommodate a bubble on a tailgate. The tailgate of a refuse truck often opens directly to discharge the load. In certain embodiments, the entire tailgate structure may lift or swing on a pivot to completely clear the entire interior cross-sectional area of the pressure vessel that forms the refuse-holding body. Accordingly, an auxiliary axle must clear all structures away from the space behind the body and below the tailgate. To do otherwise is to present substantial difficulties to structure, clutter, operational simplicity, health, and so forth.

Dump trucks tend to be shorter than refuse trucks. Auxiliary axles, particularly trailing axles that may be well adapted to dump trucks, are sometimes not well suited to refuse trucks. A truck having a single frame, rather than having a semi-tractor-trailer rig or an articulated, trailing portion, has an overall length limit in many states of about forty to forty-five feet. Auxiliary axle systems such as a trailing axle suitable for dump trucks, if attached to the rear of this type of refuse truck would extend longer than the required forty foot limit. In order to allow enough clearance in both altitude and width to fit around a bubble on a tailgate of a refuse truck, a conventional axle assembly would extend too high, typically, or extend too long in service.

What is needed is a method and apparatus for coupling a trailing, auxiliary, load-bearing axle assembly that may be designed to fit the envelope of maximum running length, maximum load-distribution length, maximum axle-separation distances, maximum top clearance, and so forth, while meeting the operational needs, transit requirements, structural limitations, suspension response criteria, and interstate commerce commission (ICC) safety considerations. What is needed is a trailing, auxiliary axle (system, assembly, etc.) that can be selectively engaged and disengaged for transit, and may be selectively removed or stowed or otherwise placed out of the way during functional operations at a source site or destination site where operations occur, such a systems needs to meet the suspension requirements in terms of loading, response times and distances, vehicle support and shock absorption from terrain and road variations expected in service (transit or operations). It should provide the maneuverability required for passage through depressions and ditches, over bumps, humps, curbs, construction banks, on roads or off roads. It should turn within residential cul-de-sacs, turn around on a roadway, back in and out of confined spaces and so forth. What is needed in particular is such functional features for refuse trucks.

In refuse trucks, legal weight limitations according to the bridge regulatory requirements on loading of axles is a substantial limitation. Moreover, a refuse truck requires a substantial amount of its time for turn-around travel. That is, a refuse truck will travel on pickup rounds during a portion of operations. Thereafter, the truck must return to a dumping, collection, or disposal area. The truck must then return to the pickup area where work was interrupted for traveling to discharge the load.

Thus, much time could be saved if, for example, a refuse truck could increase it's load by 30, 50, or even 100 percent. A refuse truck could then either operate longer in an individual area, or cover a comparatively more extensive route looping away from and back toward the discharge site. It may simply require fewer return trips to a distant site. If the load-bearing capacity of refuse trucks could be improved while fitting within the regulatory requirements for road and bridge loading by axles, an extremely significant increase in the efficiency, man-power, traffic, cycle times, and equipment utilization, may be achieved.

One may think of the tare weight of a loaded refuse truck as the actual, empty vehicle weight. The vehicle weight may be comparable to that of the load. Therefore, doubling the carrying capacity (load) does not require doubling the permissible gross (licensed, regulated) weight or the structural capacity of the truck. Realistically, bodies of refuse trucks can be designed, and many are currently designed, to support the increased pressures of compaction, and structural requirements of supporting greater loads than can be legally carried on their current axle distribution systems under present regulations.

Finally, current technology in trailing, auxiliary axle systems relies extensively on the hydraulic designs used for actuation of the framing structures (booms, beams, etc.) that make up the trailing axle assembly. Since conventional wisdom dictates hydraulic loading downward toward a boom, in order to lift a truck against the support being provided by the trailing axle from the road, the hydraulic systems must absorb road shocks. The substantial weight, of both hydraulic oil and structural masses of cylinders, pistons, frames, and the like, can dramatically change the response of a trailing axle to road impacts.

Even with shock absorption mechanisms such as accumulators, gas springs in the hydraulic reservoirs, and the like, suspension response for trailing auxiliary axles is often not consistent with that for the production axles of a truck so equipped. The geometries of many conventional trailing auxiliary axles, have often not provided operational space for conventional suspension systems (e.g. operationally equivalent to those factory-installed on the truck itself). Thus, some trailing auxiliary axles are suspended, or suspend the vehicle, inappropriately, typically more stiffly, and thus transmit structural shocks directly to the vehicle. Moreover, most auxiliary axle schemes place the wheels in an awkward position, such as right at the bubble zenith.

Partly due to such difficulties, conventional trailing auxiliary axles are tightly coupled to retractable frame assemblies that are themselves fastened securely to the underlying frame of the truck. What is needed is a suspension system more thoroughly adapted to proper suspension systems having the same frequency of response, load-bearing capacity, load distribution, load sharing distribution with respect to other axles on the vehicle, as well as the other restrictions on envelope, clearance height, ICC bumper or ICC bar height, axle separation distances, maximum weight, and so forth.

BRIEF SUMMARY AND OBJECTS OF THE INVENTION

In view of the foregoing, it is a primary object of the present invention to provide compact, trailing, auxiliary axle system for trucks.

It is an object of the invention to provide an auxiliary axle system having sufficient clearance from a road surface to incorporate an entire, conventional, truck-suspension system for the auxiliary axle, providing response times, loads, load-adjustability, and the like consistent with the conventional production, axles installed directly on a truck independent from auxiliary axles.

It is an object of the invention to provide a safe, secure, clean, accessible, structurally sound, mechanism for storage, deployment, and control of a trailing, auxiliary axle system and its operational features.

It is an object of the invention to provide a compact, trailing, auxiliary axle system that will readily meet or be adaptable to meet commercial regulatory limitations on heights, clearances, safety structures, and the like, that may be imposed upon a truck and need to be met without respect to auxiliary axles.

It is an object of the invention to provide a compact, trailing, auxiliary axle system that is attachable directly to the body of a truck, without having to affect the frame thereof, while optimizing vehicle length for equalizing loads between axles, maximizing the carrying capacity of a truck, minimizing the overall envelope of the truck in all appropriate circumstances, whether in transit or in functional operation at a work site, particularly for refuse-handling trucks.

Consistent with the foregoing objects, and in accordance with the invention as embodied and broadly described herein, an apparatus and method are disclosed, in suitable detail to enable one of ordinary skill in the art to make and use the invention. In certain embodiments an apparatus and method in accordance with the present invention may include an axle having castering wheels and tires along with a conventional suspension system, obtaining the operational distances and response frequencies available to production axles and suspension systems on conventional trucks.

An apparatus made in accordance with the invention may be secured to a frame, body, or even a tailgate piviotably attached to a body of a truck. In one embodiment, an apparatus in accordance with the invention may include protective conduits for installation, or pre-installation of control lines and power delivery systems for pneumatics, electricity, hydraulics, and so forth.

An apparatus in accordance with the invention may rely on a shorter boom, a pulling cylinder system for hydraulic actuation of the boom, with a pivot point for the boom positioned much higher in the body region rather than near the frame for a truck. An apparatus in accordance with the invention provides substantial resistance to buckling of hydraulic actuation cylinders and the boom, relying on shorter coupling distances and less extension in operation. A compact, trailing, auxiliary axle system may provide additional protection reducing damage and the requirements for hardness on hydraulic cylinder shafts. A response time for absorbing shocks induced by road surfaces is available without resort to loading the boom or hydraulic actuation cylinders directly, by virtue of clearances designed to accommodate conventional suspension systems.

In one embodiment, an apparatus in accordance with the invention may have a "broken" frame providing a boom operating at multiple angles with respect to a longitudinal, lateral, or transverse axis of a vehicle. For example, a boom comprising two beams or booms may extend down from a comparatively high pivot point on a tailgate or other structure of a body of a truck. A cross-beam at a non-pivoting end of the boom, away from the truck, may support a second frame extending away from the boom at an angle selected to provide clearance height between the second frame and the road surface. Conduits may be pre-installed to extend through the boom and the cross-beam providing electricity, air, and hydraulic oil as needed by equipment associated with the suspension system, lights, brakes, supported equipment, and the like.

An apparatus in accordance with the invention may be designed to be a properly cambered, self-steering, castered unit supporting sharp turns. Accumulators, for oil, bladders, compression tanks, and the like for accommodating shocks to the hydraulic actuation cylinders, with commensurate displacement of hydraulic oil, may be obviated. Air bags, as for conventional axles, may be installed as a primary suspension mechanism between the frame and the axle in an apparatus in accordance with the invention. Accordingly, the structure and the hydraulic actuation system for the apparatus may have greater life, less stress, and reduced fatigue and fracture susceptibility.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 9, is not intended to limit the scope of the invention. The scope of the invention is as broad as claimed herein. The illustrations are merely representative of certain, presently preferred embodiments of the invention. Those presently preferred embodiments of the invention will be best understood by reference to the drawings, wherein like parts are designated by like numerals throughout.

Those of ordinary skill in the art will, of course, appreciate that various modifications to the details of the Figures may easily be made without departing from the essential characteristics of the invention. Thus, the following description of the Figures is intended only by way of example, and simply illustrates certain presently preferred embodiments consistent with the invention as claimed.

Figure 1:
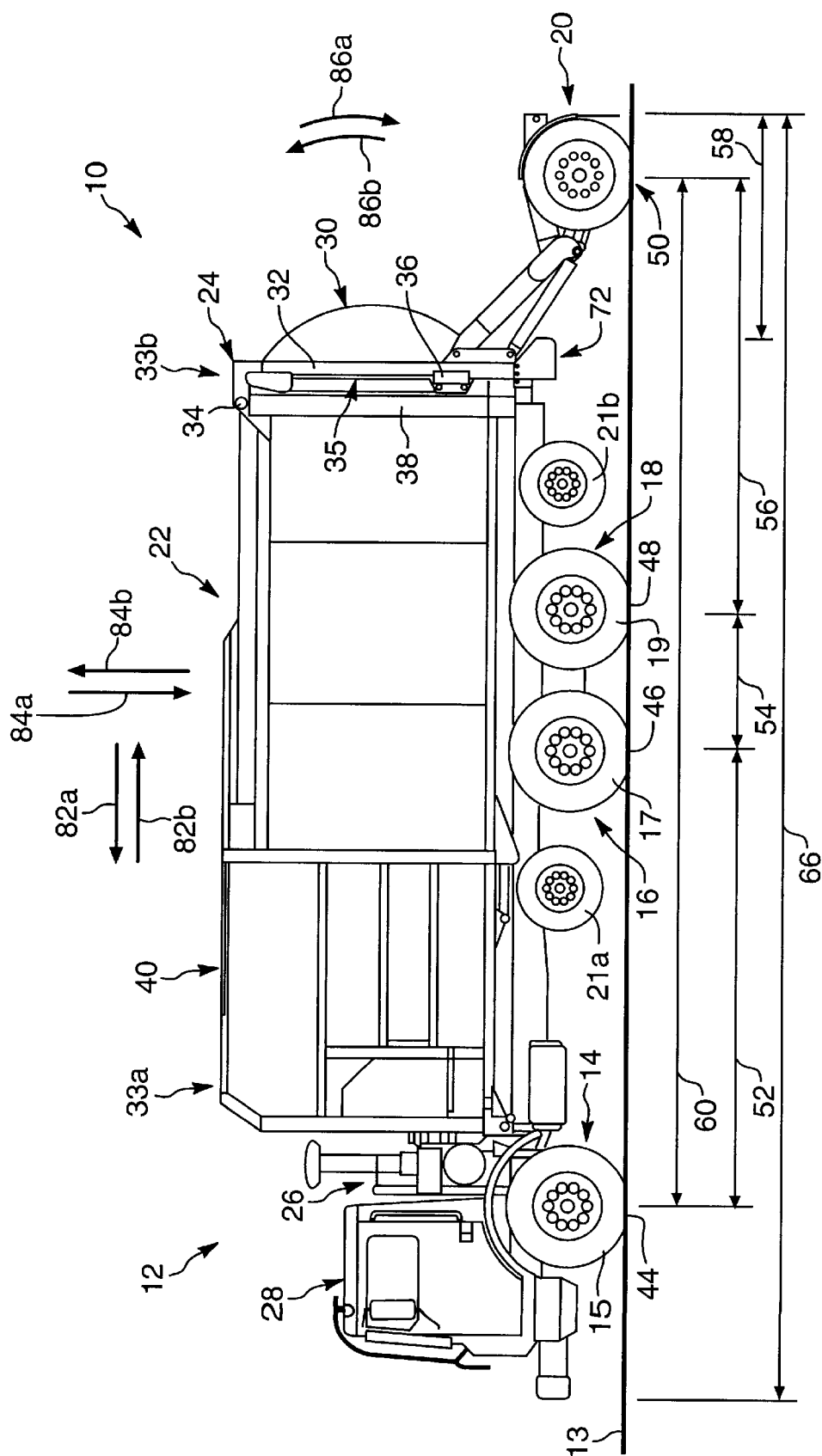
FIG. 1 is a side elevation view of an apparatus in accordance with the invention secured to the body of a truck, and disposed in a deployed position.

Referring to FIG. 1, and referring generally to FIGS. 1–9, an apparatus 10 may be formed to attach to, or to include, a vehicle 12 operating on a surface 13 or the ground 13. The vehicle 12 may include front running gear 14, often referred to simply as a front axle 14. The front running gear 14 includes tires 15, usually pneumatic in on-road types of vehicles 12.

Depending on the load rating of the vehicle 12, additional intermediate running gear 16, and an intermediate axle 16, may be included with its tires 17 in a tandem arrangement or as auxiliary "push-down" axles 21 (e.g. 21a forward, 21b rearward, or both 21a, 21b) for distributing the truck's load to a road surface 13 evenly, and for absorbing surface variations and shocks. A rear running gear 18, also referred to as the rear axle 18 includes tires 19, which may be assembled as single tires, or dual tires, side by side, on each side of the vehicle 12. In the embodiment illustrated in FIGS. 1–3, the axles 16, 18 are arranged in tandem, and may typically be arranged as duals (two tires side-by-side) at each end of each axle 16, 18.

In one embodiment, an auxiliary running gear 20, also simply referred to as an auxiliary axle 20, or an auxiliary 20, may be provided with single or dual tires 21. Herein, anytime 15, 17, 19, 21 may be referred to generically as a tire 19. In certain embodiments, single tires 19 on each end of the auxiliary 20 may be adequate. That is, the comparative wear on tires may be directly related to time, speed, load, internal pressure, and the like, in service. Accordingly, an auxiliary axle 20 is typically not in service more than half the distance or time in which the apparatus 10 and vehicle 12 are in service. Weight and size considerations may also militate for single wheels, rather than duals.

Figure 2:
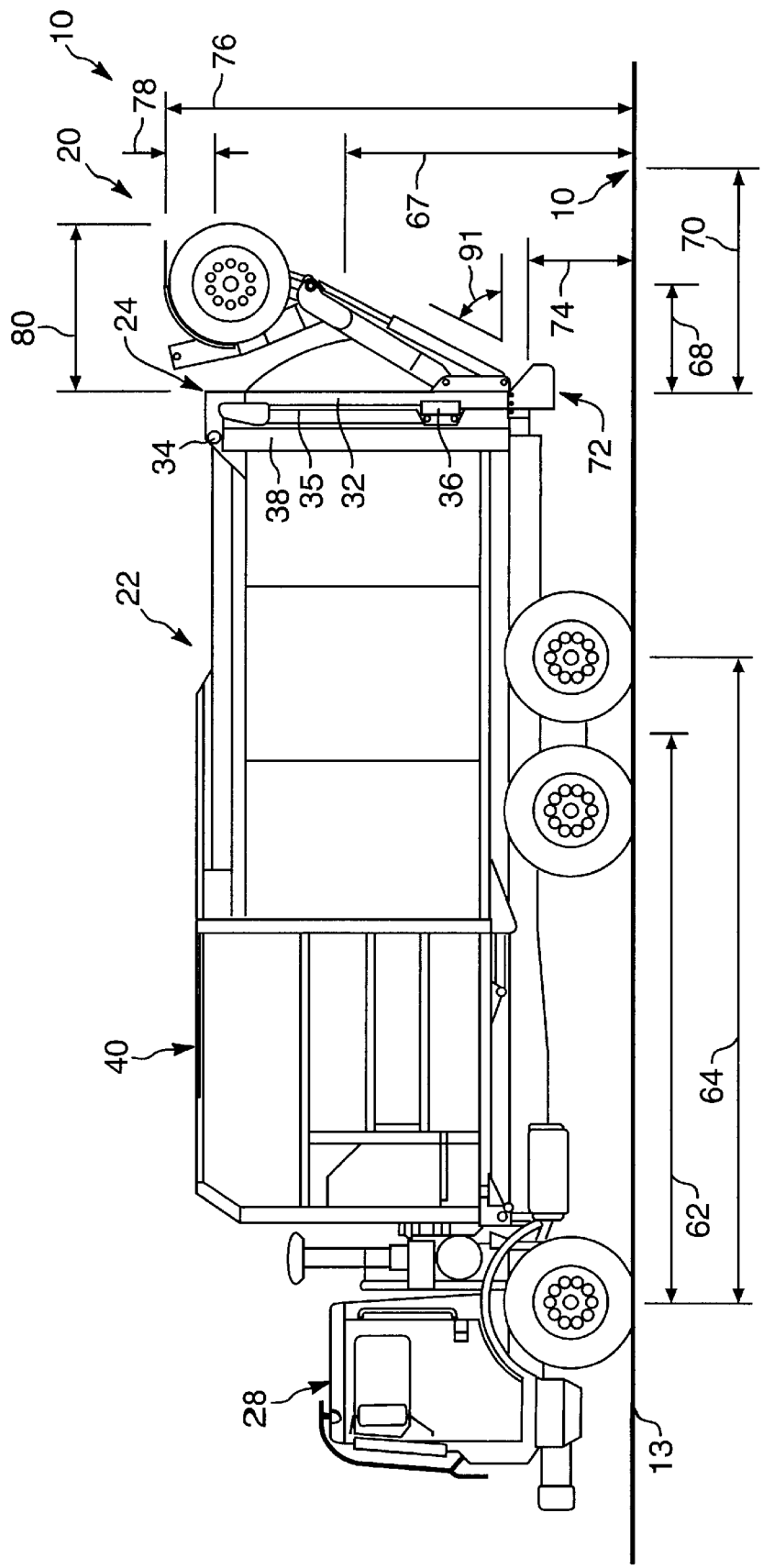
FIG. 2 is a schematic blocked diagram of the apparatus of FIG. 1 having the trailing, auxiliary axle stowed.
Figure 3:
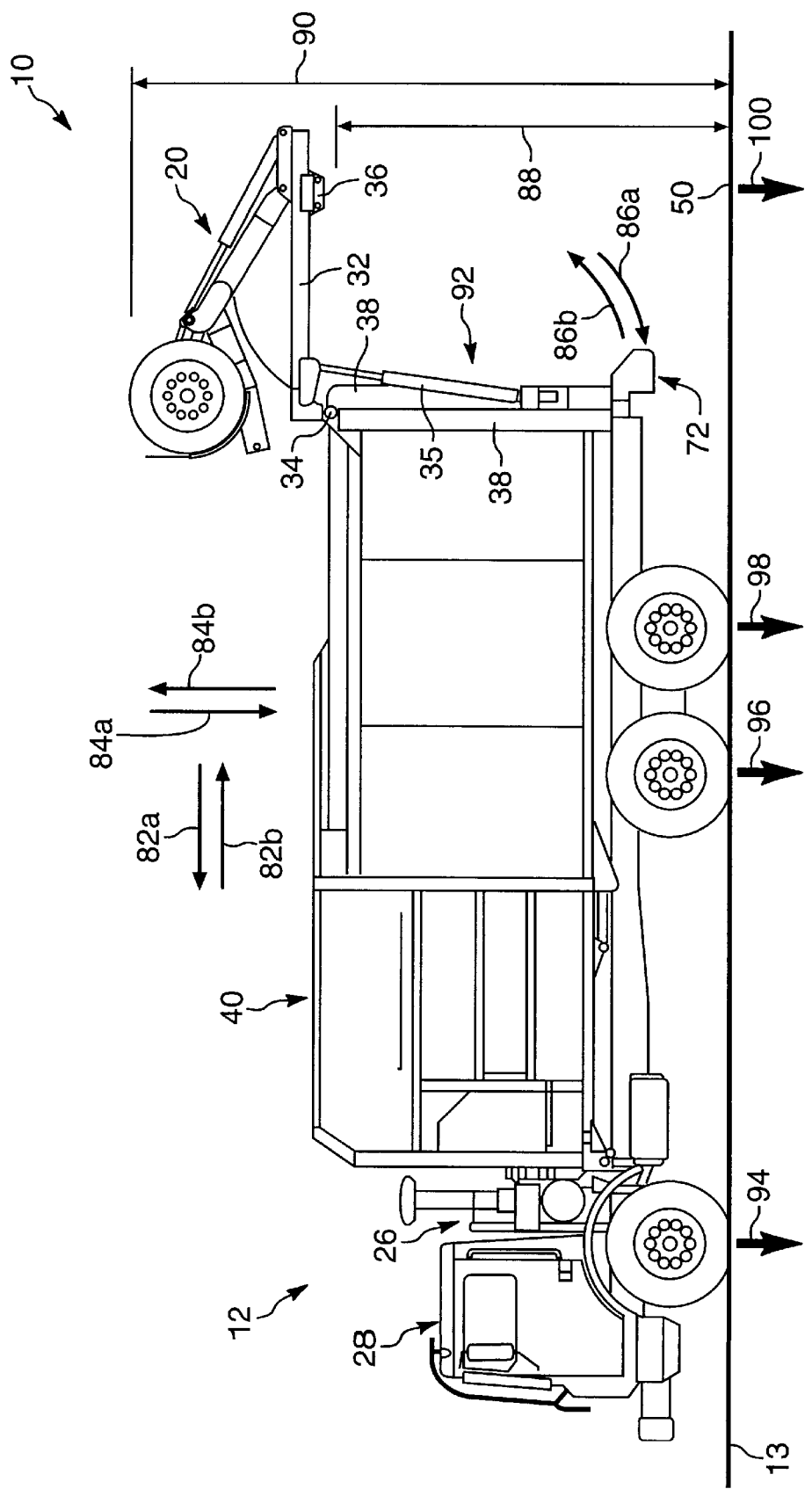
FIG. 3 is a side elevation view of the apparatus of FIGS. 1 and 2 having the tailgate of the truck opened for discharge, and illustrating the stowed position of the trailing, auxiliary axles.

The vehicle 12 may be provided with a body 22 for containing a payload. For example, a dump truck 12 will usually include an open box, tiltable and gated for discharge of material. In the illustration of FIGS. 1–3, the body 22 is adapted to receive refuse which may be ejected through a tailgate 24 when the body 22 is completely full.

The vehicle 12 may include an on-board power plant 26, although certain vehicles 12, such as concrete mixing trucks may actually have the power plant 26 mounted behind the vehicle on an articulated, auxiliary axle 20.

A cab 28 may be provided for a driver, and may be sufficiently large to accommodate other workers. In modern refuse trucks 12, automation of loading and unloading functions has largely obviated the need for more workers than a single driver. Accordingly, the cab 28 may typically be provided with electrical, pneumatic, and hydraulic controls readily accessible to be used by a single driver for operating all mechanisms of the vehicle 12.

In a refuse vehicle 12, a bulkhead 30 is designed to provide a substantial resistance to the power provided by a compactor inside the body 22. The bulkhead 30 must be designed and constructed with a substantial frame 32 and various structural support to provide stiffness, strength, and resistance to localized fracture due to extremely high loads. That is, the body 22, in general, of a vehicle 12 must support comparatively large compaction forces.

As a practical matter, much of the refuse hauled in the body 22 will be solid material. Accordingly, substantial resistance to shear forces will be provided by the material itself Thus, when a compression plate is pushed by a mechanism such as a hydraulic ram (not shown) from a position near the front end 33a toward the back end 33b of the body 22, the refuse material does not typically act substantially as a fluid. Instead, most of the load is borne by the tailgate 24. Thus, pressure is non-isotropic, the bulkhead 30 is often rounded in accordance with pressure vessel construction techniques in order to increase the integrity and decrease the stress and stress concentrations between the bulkhead 30 and the frame 32 supporting the bulkhead 30.

The tailgate 24 may be provided with a pivot 34 suitably located on the frame 32 in order to pivotally link, the frame 32 and the associated bulkhead 30 to the body 22. The pivot 34, in one embodiment, may be located near the top of the body 22. At an appropriate location away from the pivot 34, an actuator 35, such as a hydraulic cylinder 35, may be secured to open the bulkhead 30 and frame 32 under operator control. A latch 36 may secure the frame 32 and bulkhead 30 to the body 22. As a practical matter, one may refer to the frame 32 and the bulkhead 30 as the tailgate 24. Thus, the tailgate 24 may have a pivot 34 about which to rotate or pivot between an open position (see FIG. 3) and a closed position (see FIG. 1). A latch 36 may secure the tailgate 24 in the closed position.

The latch 36 may be built to rigidly secure the frame 32 of the tailgate 24 to the frame 38 of the body 22. Accordingly, when the compression mechanism within the body 22 is actuated to compress refuse toward the tailgate 24, the bulkhead 30 receives the load as a force, and as a pressure, to the extent that the force is distributed. The bulkhead 30 transfers its forces to the frame 32. The frame 32 transfers load through the pivot 34 and the latch 36 to the frame 38 of the body 22.

During pickup and loading, a refuse vehicle 12 may "cube out" or may "gross out". For a vehicle 12 to "cube out" means that the volumetric capacity of the body 22 has been reached usually governed by size and compaction ability. For a vehicle 12 to "gross out", the maximum weight that the vehicle 12 is permitted to carry, usually governed by structural considerations or legal loading requirements, has been reached.

Because of the compaction and body size available in refuse vehicles 12, and the comparative ease of designing substantial frames 38 and tailgates 24 to support a maximum of compaction forces, refuse trucks usually "gross out". Refuse trucks 12 "gross out" due to the regulatory limits on the total weight of the vehicle 12 allowed on a roadway or bridge, in accordance with the number of axles 14, 16, 18, 20 available.

The auxiliary 20 may be provided to relieve constraints on the weight of the vehicle 12 in several respects. For example, the auxiliary 20 provides an additional axle 20 that is permitted to carry some regulatory maximum of loading. However, the location of the trailing auxiliary axle 20 is such that any load support provided by the auxiliary 20 tends to rotate the vehicle 12 and body 22 about the intermediate axle 16 and rear axle 18. Thus, the auxiliary 20 may tend to provide additional loading of the front axle 14 yet reduce turning radius. Thus, all of the axles 14, 16, 18, 20 may be more uniformly loaded by proper design of the auxiliary 20.

Moreover, the auxiliary 20 may be spaced from the rear axle 18 providing more distribution of loads, thus meeting another criterion of regulatory limits on truck weights and distribution over a number of axles. In addition, on certain roadways, trucks may be charged, such as over toll roads and bridges, for the number of axles in service. Accordingly, having all axles 14, 16, 18, 20 in service at all times may be unnecessarily costly. Thus, the trailing auxiliary axle 20, by being stowable and deployable, selectively, may maximize gross weight available to be carried by the body 22, while minimizing the per-axle cost when empty, and without sacrificing maneuverability in any circumstance. In this regard, the castering tire 20 may shorten the wheel base 64, reducing the turning radius.

The body 22 may be provided with a port 40 near the top of the body 22. The port 40 may be centrally located near the lateral (left/right) center of the body 22, or may be adapted to receive refuse from one side or another of the vehicle 12. The port 40 may be serviced by a lift (not shown) such as a hydraulic arm for lifting refuse containers (drums, barrels, dumpsters, boxes, etc.) positioned at the front of vehicle 12, beside the vehicle 12, or at the rear of the vehicle 12.

Continuing to refer to FIG. 1, and generally to FIGS. 1–3, the port 40 may include rigid or movable members forming a chute, and may include a side bay, depending on the refuse-handling equipment adapted for pickup and loading. However, loading equipment is not shown, as the vehicle 12 or truck 12 may be adapted to any particular configuration. However, for understanding, a port 40 or chute 40 typically accommodates hydraulic ramming equipment for compressing a load in the body 22. The compression typically occurs between hydraulic ram equipment near the front end 33a pushing toward the bulkhead 30 or bubble 30 of the tailgate 24 near the back-end 33b or rear 33b.

The vehicle 12 has contacts 44, 46, 48, 50 with the road surface 13, and the tires 15, 17, 19 of the axles 14, 16, 18, 20, respectively. The contacts 44, 46, 48, 50 are not actually points but surfaces corresponding to the loads and respective pressures of the tires 15, 17, 19. In general, one may refer to any tire 15, 16, 21 as a tire 19, generically, herein. Distances 52, 54, 56 may be defined between respective axles 14, 16, 18, 20. Extension 56 past the wheelbase 60, and extension 58 may be defined. The total additional length 56 by which the auxiliary 20 or auxiliary axle 20 may extend behind the tailgate 24 of the vehicle 12 is important and legally limited. The extension 56 does not extend the wheelbase 60 due to castering.

In general, a distance 60 may be defined as a maximum wheelbase for the vehicle 12. Meanwhile, the distance 62 may be considered as the effective turning wheelbase 62. With the auxiliary 20 in place, deployed for supporting a portion of the load of the vehicle 12, a maximum wheelbase 64 of a truck is extended to an overall wheelbase 60.

Clearance heights are a consideration in all aspects of design of a vehicle 12. For example, a cab height 67 may not pertain to the vehicle 12, itself. Rather, the cab height 67 corresponds, typically, to the effective cab height of a vehicle following the vehicle 12 in question. Accordingly, the overall length 66 of the vehicle may change between a deployed and a stowed configuration of the auxiliary 20. Accordingly, the stowed configuration of the auxiliary 20, illustrated in FIG. 2, may be required to be reduced, or provided a warning, clearance lights, or the like, effective to preclude accidental impact between a vehicle following and the vehicle 12. Thus, the cab-height-level extension 68 may be very important for the apparatus 10 in meeting regulations, such as those imposed by the Interstate Commerce Commission (ICC), or state regulatory bodies.

A lever 70 or extension distance 70 may be defined between a contact 50 or contact point 50 and the tailgate 24. Likewise, a bumper 72 or ICC bar 72 may be provided on the vehicle 12. Accordingly, a height 74 may be defined by regulation of a transportation regulatory agency or certain municipalities. The height 74 may be the minimum bumper height for preventing injury to occupants or damage to a cab region of a trailing vehicle, such as an automobile.

At an opposite extreme, a maximum height 76 may be defined for practical operation reasons or regulatory limits. Thus, a height difference 78 between the body 22 of the vehicle 12 and the auxiliary 20 in a stowed configuration may be significant. In one embodiment, an auxiliary 20 may be designed and constructed to minimize the extension 78 or height difference 78 between a body 22 and the auxiliary 20. Thus, the auxiliary 20 provides no more difficulty in meeting the maximum height 76, than the factory-produced truck 12 in a stock configuration.

An extension length 80 of the auxiliary 20 in a stowed configuration may be a concern. However, the cab-level extension distance 68 is the more probable limitation of the extension of an auxiliary 20 in a stowed configuration from a body 20 to a vehicle 12.

With respect to a vehicle 12, directionality may be defined for simplified descriptions and explanations. Accordingly, one may regard a longitudinal direction 82 as extending along a nominal length of a vehicle 12 or apparatus 10. Thus, forward 82a or backward 82b are subsets of a longitudinal direction 82. Similarly, a transverse direction 84 may refer to either the upward 84a or downward 84b subsets thereof. A circumferential direction 86 may be either clockwise 86a or counter-clockwise 86b. Moreover, a lateral direction 83 may extend substantially orthogonally to the longitudinal direction 82 and the transverse direction 84. Thus, as seen in FIGS. 1–7, leftward 83a and rightward 83b are subsets of a lateral direction 83. Nominally, with an upright truck operating properly, the transverse direction 84 is up and down with the longitudinal direction 82 being forward and backward and the lateral direction 83 being side to side.

If a tailgate 24 is pivoted to rise above the body, maximum clearance is provided in all directions behind and below the body 22. An auxiliary 20 secured to a tailgate 24 will necessarily extend to a maximum height 90 well beyond the body height 88. The apparatus 10 includes an auxiliary 20 secured to "wrap around" the bulkhead 30 or bubble 30 minimizing the maximum height 90.

The maximum height 90 may be of most significance in certain installations in which refuse is transferred to stations for additional processing or transport inside buildings. For example, in large metropolitan areas, open land fills have become inappropriate or undesirable. Thus, transfer stations may sort, burn, further compact, package, or re-load refuse. Accordingly, nearer inside such buildings, clearances may be limited such as for the maximum height 90. Thus, the apparatus 10 provides a minimum value of the height 90 above the bulkhead 30 and the body height 88.

A bay 92 may be a completely clear aperture with respect to the body 22. Accordingly, the bay 92 may be completely open by pivoting the tailgate 24 sideways, or upward away from the frame 38 on a pivot 34. The auxiliary 20, in one embodiment in accordance with the invention, leaves no remaining structure to obstruct the bay 92 during discharge of a load from the body 22. Thus, the maximum wheelbase 60 may be achieved with a minimum extension 68 at the cab height 67 for a following or trailing vehicle, due to the appropriate angle 91 of the auxiliary 20, and the conformance to the bulkhead 30 or bubble 30. Thus, no machinery is left to clutter the operational area behind or below the aperture 92 of the body 22.

Each of the axles 14, 16, 18, 20 provides a load 94, 96, 98, 100, respectively, to the road surface 13. Similarly, one may think of the loads 94, 96, 98, 100 being asserted in an opposite direction by the road 13, supporting the truck 12. A brief analysis of the moments provided by the forces 94, 96, 98, 100 (generically each may be called a force 100) will illustrate a value of the auxiliary 20 in adjusting the loads 100 across all axles 14, 16, 18, 20. When the force 100 is increased by actuation of suspension-modifying (extending) features of the apparatus 10, the truck 12 and body 22 are rotated (pivoted) about the rear axles 16, 18, further loading the front axle 14, increasing the force 94. A couple may be induced by the force 100 acting upward from the ground to the auxiliary 20. Depending on the details of such couple, the force 100 may tend to unload the axles 16,18, reducing the forces 96, 98, and further loading the axles 14, 20 with increased loads 94, 100, respectively. Moreover, the total number of axles 14, 16, 18, 20 as well as the total load 94, 96, 98, 100 on each axle 14, 16, 18, 20 can thus be adjusted. Accordingly, every axle 14, 16, 18, 20 may carry an amount much closer to its maximum permissible load by proper adjustment of the apparatus 10.

Figure 4:
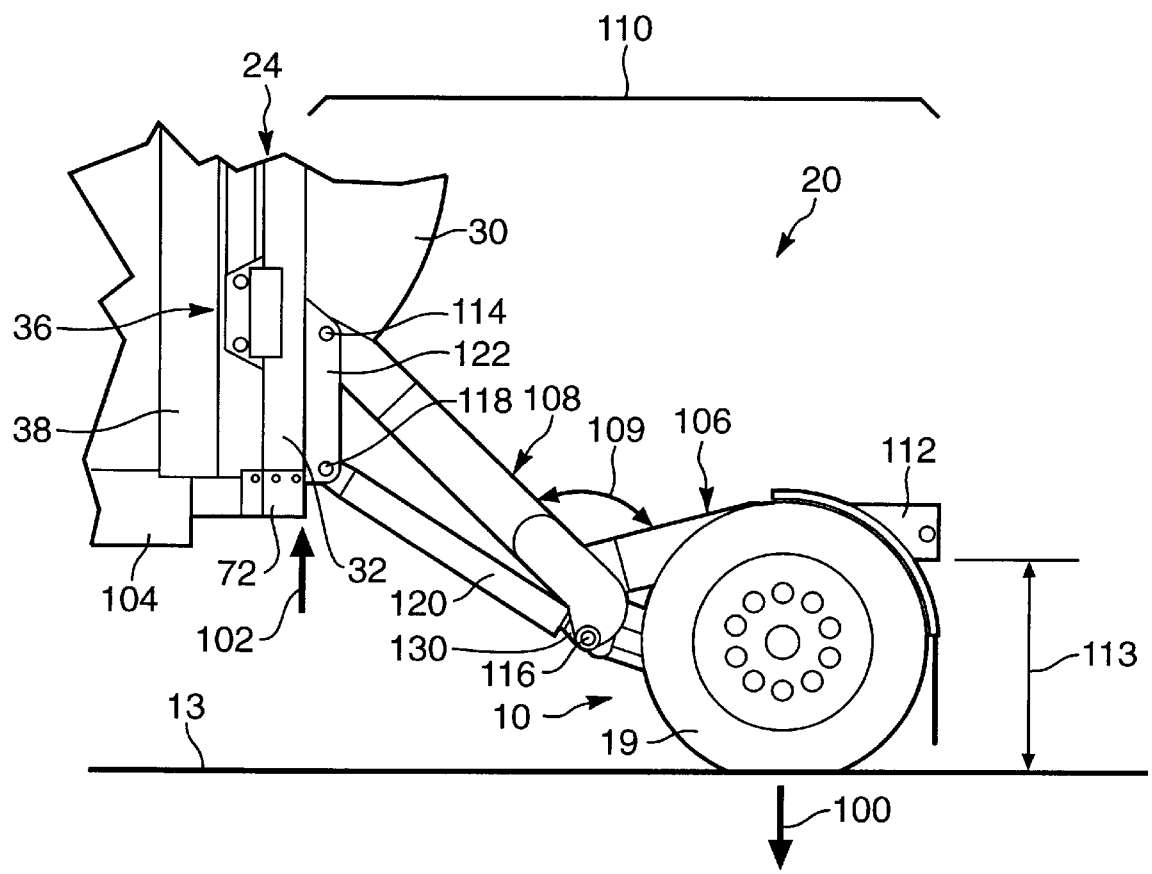
FIG. 4 is a side elevation view of an apparatus in accordance with the invention illustrating the specific operational components designed and adapted for meeting the objectives of the invention.

Referring to FIG. 4, and generally to FIGS. 4–8, while still referring to FIGS. 1–3, an auxiliary 20 may apply a force 102 upward 84a to the tailgate 24 of a body 22 of a vehicle 12. Meanwhile, the auxiliary 20 provides a downward force 100 to the surface 13 of a road or of the ground. As a practical matter, the distance between the forces 100, 102 induces a substantial couple, discussed below, on the apparatus 10 and the tailgate 24. Accordingly, a frame 104 of a vehicle 12 is typically secured in fixed relation to a tailgate 24 with appropriate latches 36 and framing 38 for supporting the compressive loads required in operation.

The auxiliary 20 need not be secured directly to the frame 104. Instead the auxiliary may be connected to the frame 32 of the tailgate 24, supporting the bulkhead 30 portion of the tailgate. As a practical matter, the frame 32 and the bulkhead 30 may form the entire tailgate 24 with some means for latching 36.

The auxiliary 20 may be formed to have a frame 106 or suspension frame 106 adapted to receive a conventional suspension system suitable for mounting directly on a vehicle 12. The frame 106 may extend longitudinally 82 from a boom 108 or booms 108a, 108b secured to the tailgate 24. In one embodiment, an angle 109 formed by the frames 106, 108 may be selected to accommodate structures, pivoting motions, hydraulic actuation, and so forth of the frame 108, with a clearance 74 (see FIG. 2) effective to support the running gear (axle, wheel, tires) of a conventional vehicle 12. Thus, the frames 106, 108 may be thought of as forming a dogleg 110 or frame 110 operating as the principal frame 110 for the auxiliary 20. The principal frame 110 or dogleg 110 provides the principal load-bearing structure for the auxiliary 20.

A frame 112 or extension frame 112 may be adapted to the dogleg 110, such as to extend from the frame 106 (the suspension frame 106). Thus, a height 113 may form an extension clearance 113 meeting ICC regulations equivalent to those imposed on the vehicle 12 proper. Together, the extension frame 112 and the tires 19 of the auxiliary 20 protect following vehicles from inordinate damage in the event of accidental impact.

The frame 110 may be secured at a pivot 114, such as a pin, bolt, bearing, ball-joint, or the like. In one embodiment, a clevis 114 may be used. Similarly, the high pivot 114 may correspond to a lower pivot 116 at the opposite end of the frame 108. The pivot 116 corresponds to a low body pivot 118, each disposed at an opposite end of a piston 120 or hydraulic cylinder 120 for actuating the auxiliary 20. That is, a hydraulic cylinder 120 may be fixed between the pivots 116, 118, for extending, thus forcing rotation of the boom 108 or frame 108 about the pivot 114. The triangulation of the bracket 122, in combination with the boom 108 and hydraulic cylinder 120, provides a rigid structure, whose shape is controlled by the amount of extension provided by the hydraulic cylinder 120.

Figure 5:
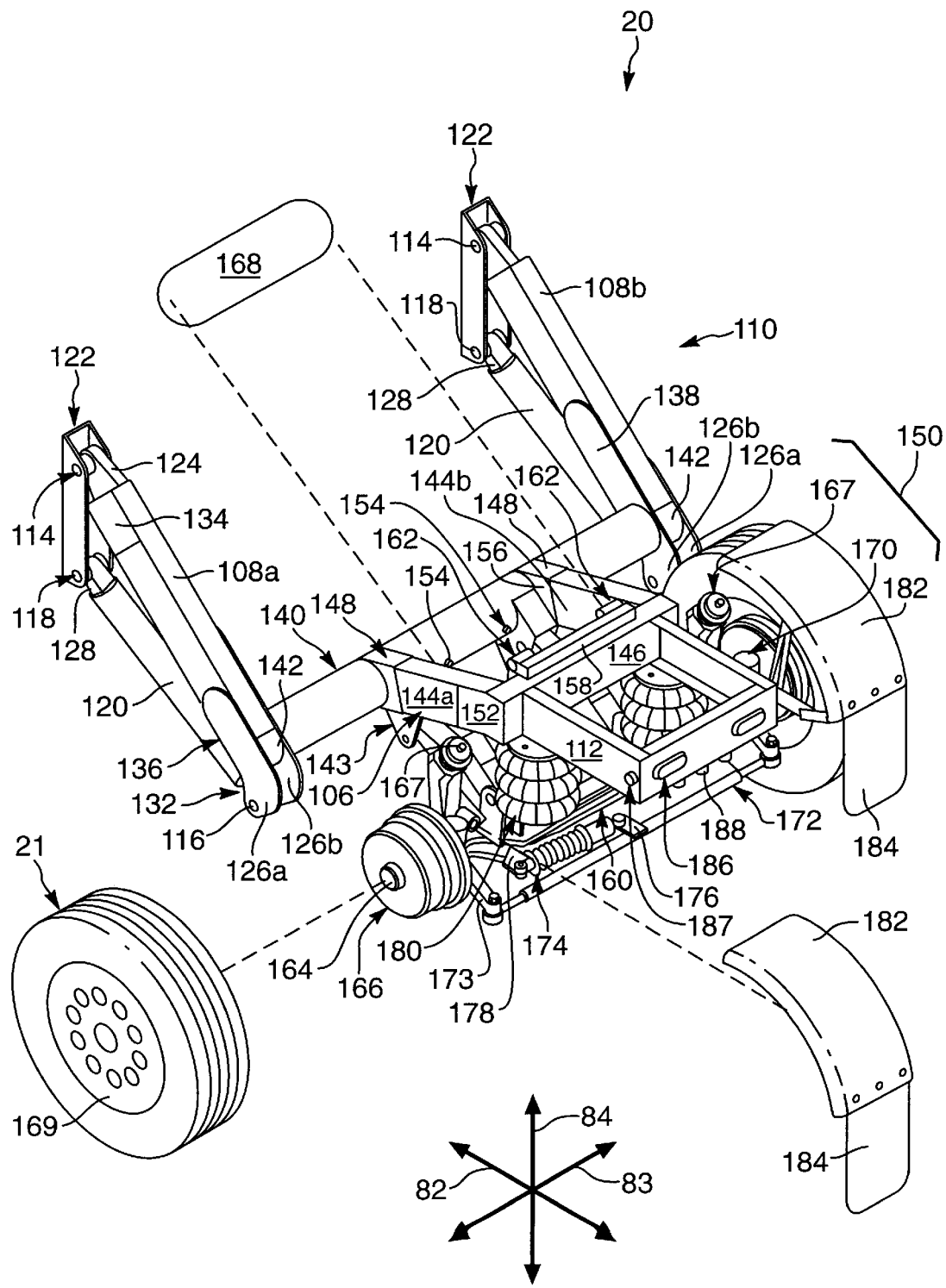
FIG. 5 is a perspective, exploded view of an apparatus in accordance with the invention illustrating a deployed position with actuation mechanisms and suspension systems in place.

Referring to FIG. 5, while referring generally to FIGS. 1–4 and FIGS. 6–9, the bracket 122 may be adapted to receive an ear 124 of the boom 108 (left side 108a, corresponding to a right boom 108b, etc.). Opposite the bracket 122 and pivot 114, a clevis 126 may be formed of two halves 126a, 126b or ears 126a, 126b. The clevis 126 captures the cylinder 120 at the pivot 116. Similarly, an ear 128 is captured by the pivot 118 such as a pin 118 in the bracket 122. As a practical matter, one may refer to the pivot 118 as the bracket 122 and a pin 118 associated therewith in combination with the ear 128. Nevertheless, one may also refer to the pin 118 as the pivot, with the bracket 122 and ear 128 piviotably connected thereby.

The hydraulic cylinder 120 is made up of a rod 130 or ram 130 as well as an outer cylinder 120. Nevertheless, it is not improper to speak of a hydraulic cylinder 120 as either the outer cylinder 120, or the entire assembly 120 including the extensible rod 130 or actuator 130. Thus, as illustrated in FIGS. 4–7 a rod 130 may have an end 132 or an ear 132 captured in a clevis 126 forming a pivot 116.

In one embodiment, a piece 134 may be formed of an angle iron stock in order to close the boom 108 after welding the ear 124. In another embodiment, the piece 134 may be or include a doubler 134 to further strengthen the boom 108. The clevis 126 may be formed to include additional doublers 136, 138 outside and inside, respectively, of the frame 108.

A cross-beam 140 may be constructed in a variety of configurations. The cross-beam 140 in one presently preferred embodiment is a cylinder providing a balance of strength, weight, stress concentration relief, assembly ease, alignment simplicity, and fastening integrity.

In one embodiment, a cross-beam 140 may have an end 142 extending between the ears 126a, 126b of the clevis 126. The boom 108 and the cross-beam 140 may be closed in, such that all intersected, or some intersected, surfaces or structures appear to extend continuously. For example, the doubler 138 need not actually be formed as a single piece with the ear 126. The interruption by the cross-beam 140 may be partial or complete across the dimension of the doubler 138. Nevertheless, structurally, the doubler 138 and ear 126b of the boom 108b may be extended within the cross-beam 140 by a diaphragm (e.g. see FIG. 8, bulkheads 220, 226; diaphragms 220, 226).

Meanwhile, the suspension frame 106 may obtain a superior weld extending virtually half the circumference of the cross-beam 140. This may provide a reduction of inherent stress concentration factors due to corners that would be presented by a rectangular cross-beam 140. Thus, the cross-section of the cross-beam 140 is preferably circular, rendering the cross-beam 140 a right, circular cylinder.

Ears 143 paired as a clevis 143, may be secured to side beams 144a, 144b of the suspension frame 106. A lateral beam 146 between the side beams 144a, 144b may, together with a portion of the cross-beam 140, form the suspension frame 106.

A strap 148 or doubler 148 may be provided to extend partially or completely around a circumference of the cross-beam 140. The doubler 148 may provide additional stiffness, strength, and the like. Moreover, the doubler 148 provides additional welding length for securing to the side beam 144a, 144b as well as to the cross-beam 140. In one embodiment, the straps 148, or doublers 148 may extend completely around the cross-beam 140 to re-attach to the side beam 144. A reference numeral followed by a trailing alphabetical character refers to a specific instance or a specific portion of the generic item referenced by the initial reference numeral.

The suspension frame 106 may be adapted to receive a complete suspension system 150 or suspension 150 that would normally be provided on a factory-assembled vehicle 12. The hydraulic cylinders 120 and the boom 108 need not provide the suspension system (shock absorption with deflection, and drag-link, respectively) for the auxiliary 20. Instead, a conventional suspension 150 has sufficient clearance 113 to be fit under the suspension frame 106. Thus, the dogleg 110 adapts to several needs at once, such as the shape of the bubble 30 and the clearance 113 needed for a suspension system 150.

Cap plates 152 may act as doublers 152, boxing in and strengthening the fabrication of the frame 106 of side beams 144 and the lateral beam 146. In certain embodiments, cross-sections of the side beams 144 and lateral beam 146 may be boxed or rectangular, tubular members or may be open members such as channel iron, I-beams, and the like.

Utility bushings 154 may be provided to pass lines through the frame 108. For example, electricity for brakes, air for pneumatic control of the suspension 150 and the like, including hydraulic lines for actuating hitches, lifts, height-adjustments, and the like, may be so driven. Lines may be threaded through the frame 108, exiting through bushings 154 appropriately placed and sized in the cross-beam 140, and frame 108, generally.

A doubler 156 may be provided alongside a strap 148 or doubler 148 on the side beam 144. As a practical matter, additional welding, as well as distribution of welds away from a contact point between two individual members assembled by fabrication, provides additional strength, relief of stress concentrations, and even removal of certain welds. For example, the doubler 156 may be welded along all edges pertaining thereto. Alternatively, the doubler 156 may be welded only at selected locations or along selected edges, leaving other portions of the side beams 144 free of the doubler 156, yet extending parallel thereto.

A mounting bar 158 may be mounted on the frame 106, opposed the axle 160 proper, with shock absorbers 162 or dampers 162 extending therebetween. Thus, the shock absorbers 162 may provide a resistance force proportional to the speed of relative motion between the mounting bar 158 (and frame 106) and the axle 160. Disposed at opposite ends of the axle 160 may be spindles 164 about which rotate the brake drums 166, wheels 169, and tires 19. A brake cylinder 167 may be adapted to actuate breaks 166, by any means known in the art.

Air tanks 168 may be provided to adjust the suspension 150, or to operate brakes 166. Herein it is not necessary to show all the details of brakes 166, and thus the brake drum 166 may represent the entire brake system 166, in general, actuated by a brake cylinder 167.

An air tank 168 can provide energy to operate brakes 166. However, brakes 166 may also be operated electrically. An air tank 168 may provide pressurized fluid (air) for adjusting the suspension 150.

Much of the structure of the suspension 150 is rigid, or rigid within at least one dimension or direction 82, 83, 84, 86. For example, kingpins 170 provide pivoting of the wheels 169 for castering. The kingpins 170 are disposed to provide a particular camber adapted to the loading, directionality, steering, wear, and so forth, of the auxiliary 20. A tie rod 172 connects arms 173 fixed with respect to the spindles 164, assuring coordinated movement of the wheels 169 and spindles 164. As a practical matter, the tie rod 172 may be damped by a shock absorber 174 similar to shock absorbers 162, but disposed to damp motion along the length of the tie rod 172. Brackets 176, 178 may secure the shock absorber 174 to the tie rod 172 and axle 160, respectively. A spring 175 may be provided to bias the tie rod 172 toward a stable, centered, position.

The air bags 180 or bladders 180 provide an important part of the suspension 150. Many auxiliary axles, in prior art vehicles, typically use unique suspension systems that do not provide the frequency of response, total load, or other characteristic desired from a production axle 14,16,18 of a vehicle 12. By contrast, an apparatus 10 in accordance with the invention, may provide sufficient clearance 113 to the suspension frame 106 to provide conventional air bags 180 as part of the suspension 150. Accordingly, the air tank 168, whether independent from or integrated with the cross-beam 140, may provide the makeup air for actuation, control, and support for the air bags 180.

Fenders 182 and flaps 184 may be provided, in addition to tail lights 186, riding lights 187, and clearance lights 188 to meet regulatory requirements. Since the auxiliary 20, as the frame 110, in particular, includes a frame 112 or extension frame 112, regulatory devices may be disposed thereon. Since the dogleg 110 is adapted to provide clearance 113 for the entire suspension 150, the extension frame 112 may be readily positioned to provide those features normally required of the frame 104 and bumper 72 or ICC bar 72.

Figure 6:
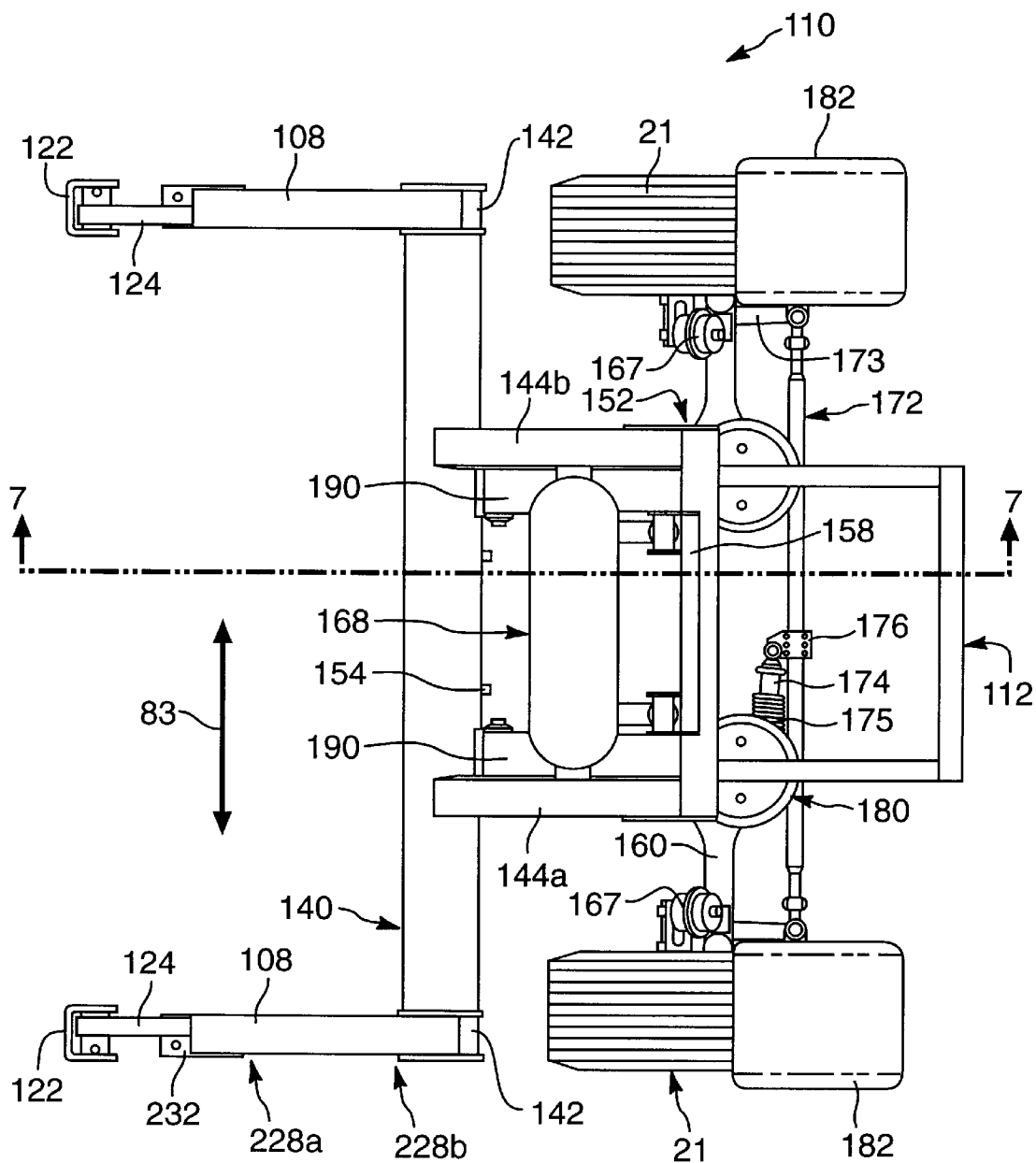
FIG. 6 is a top plan view of the apparatus of FIG. 5.
Figure 7:
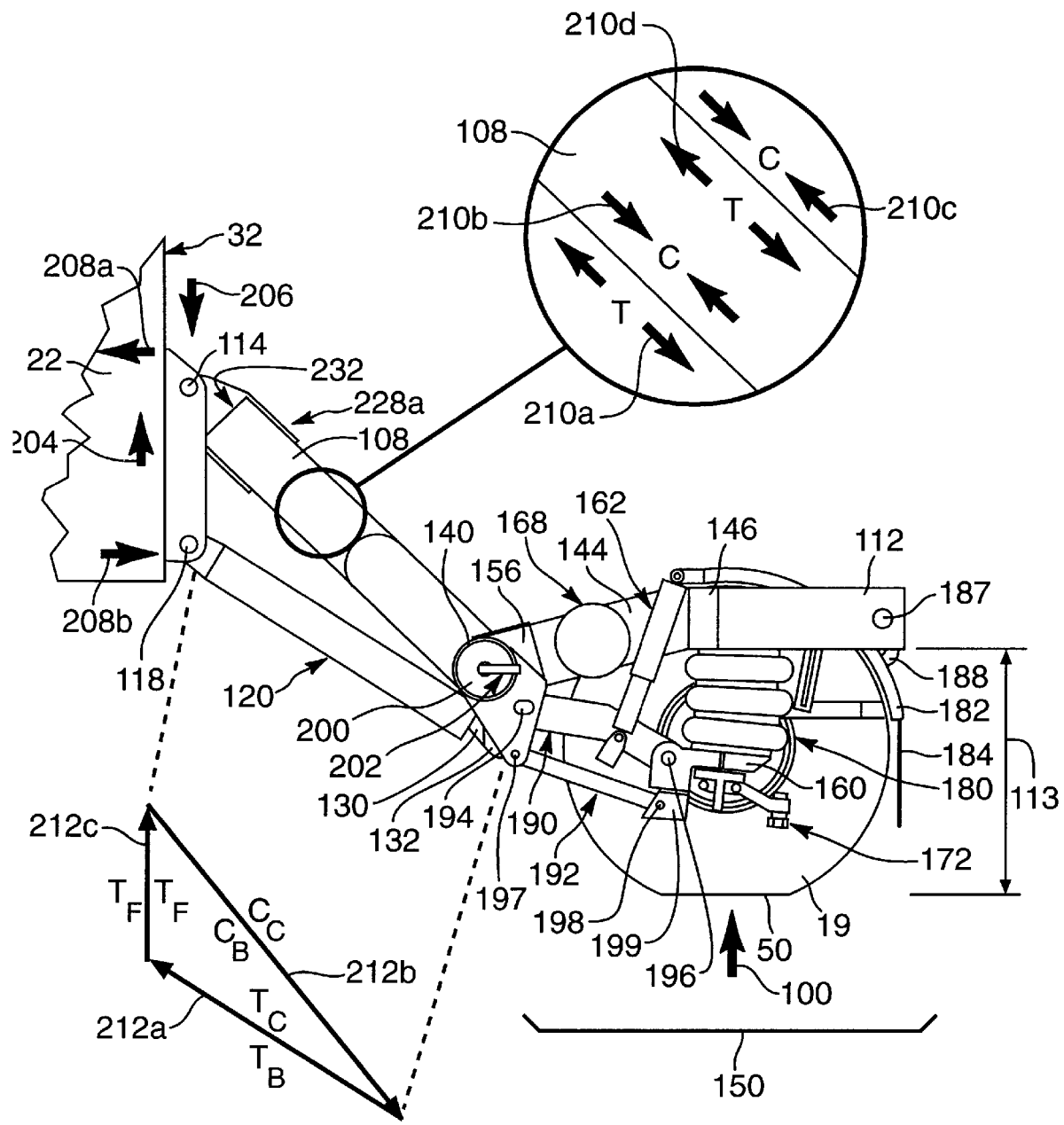
FIG. 7 is a side elevation view of the apparatus of FIGS. 5–6 illustrating the suspension system, the deployment system, and the comparative stress and load relationships for the attachment and deployment mechanisms.

Referring to FIGS. 6–7, and generally to FIGS. 1–9, an arm 190 or trailing arm 190 may be secured piviotably to a bracket 143 or ear 143 mounted on the dogleg 110. In one presently preferred embodiment, the ear 143 or bracket 143 may be mounted directly to the cross-beam 140, and to the side beams 144. A four-bar linkage may be formed by the bracket 143 or clevis 143 and the captured trailing arm 190 (sometimes referred to as a suspension arm, or drag-link), a torque arm 192, and the bracket 199 secured to the axle 160.

Pivots 194, 196, 197, and 198 connect the bracket 143 to the arm 190, arm 190 to the bracket 199, bracket 143 to the arm 192, and the arm 192 to the bracket 199, respectively. Regardless of the shape of the suspension arm 190, an effective four bar-linkage may provide a stabilized motion in the suspension 150, in response to elevation changes by the tire 19 and wheel 69 over the road surface 13.

The air bags 180 may provide the proper loading, and full travel in a transverse direction 84 as needed. The shock absorbers 162 may provide all the damping expected from a production suspension 150.

In on embodiment, a bulkhead 220 may extend across an interior portion of the lateral beam 140 or cross-beam 140. The bulkheads 200, 226 support and stiffen the cross-beam 140 against twisting torsional failure. Torsion in the cross-beam 140 may be substantial. Since the suspension 150 is so effective, torsional loads in the cross-beam 140 are reduced as compared to those that would exist without the suspension 150 as described herein.

Figure 8:
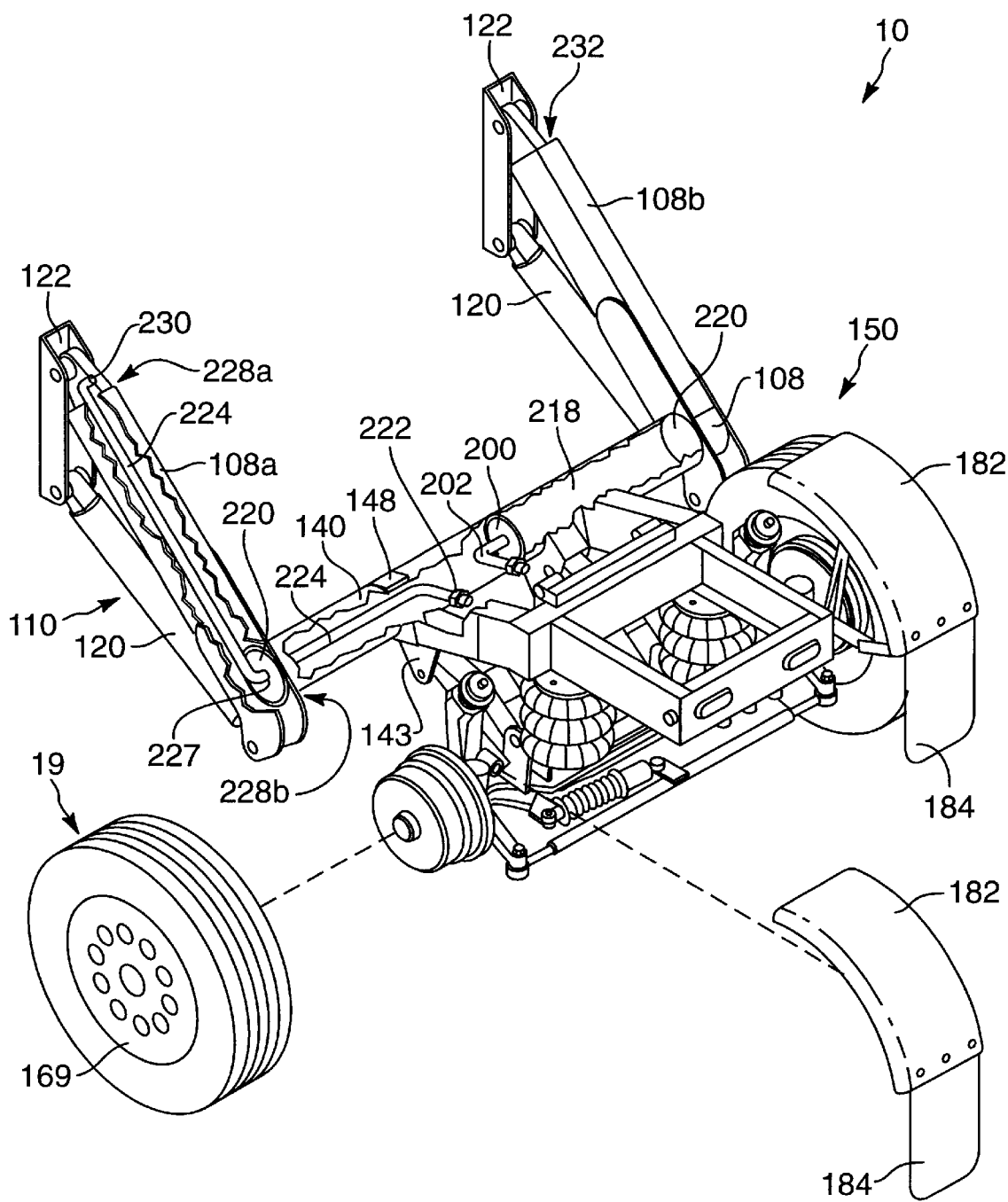
FIG. 8 is a perspective, exploded view of an apparatus in accordance with the invention, illustrating selective alternative embodiments for maintaining integrity, simplifying installation, and reducing exposure to damage-susceptible components.

Referring to FIG. 7, and generally to FIGS. 6–8 with reference to FIGS. 1–5 as hereinbefore described, lines 202 may be disposed to extend through the frame 108, or the entire dogleg 110. The lines 202 may conduct air, oil, electricity or the like. The lines 202 may penetrate the bulkheads 200, 226.

In one embodiment, the bulkhead 200 may form an alternative, hidden, integrated tank 168. The tank 168 of FIGS. 5–7 may be replaced 6 an integral tank formed by the bulkhead 200, and the cross-beam 140. A line 202 may be an air line for operating the air bags 180. Alternatively, lines 202 may merely pass through a bulkhead 200, carrying any entity required for operation or control of the apparatus 10.

Forces 204 applied to the tailgate 24 by the bracket 122 in a substantially transverse 82 direction, tend to lift the body 22 of the vehicle 12. Correspondingly, the bracket 122 receives a force 206 corresponding to the weight, or the proportion of the weight, of the truck 12 to be supported by the axle 20. Note again that it is not improper to speak of the entire auxiliary 20, as an axle 20, since it is clear to one of ordinary skill in the art that an axle 160 proper is a component, but the assembly 20 is properly referred to as an axle, meaning the axle and assembly for providing a unit of suspension to a vehicle.

Thus, a couple 208 is provided having components 208a, 208b. The couple 208 represents the effect on the truck 12 of the couple formed by forces 100, 206 on the auxiliary 20 or frame 110.

Additional benefits accrue to the dogleg 110 as a result of the configuration of the booms 108, suspension frame 106, and hydraulic cylinders 120. For example, forces 210 operating within a boom 108 are illustrated. A force 210a represents tension in the lower edge of a boom 108, with force or stress 210*c* the corresponding compression due to the bending moment imposed by the force 100. A force 210*b* represents compression, and force 210*d*, tension, due to the countering moment of the cylinder 120 acting on the lever arm defined by the offset of the clevis 132 and pivot 126 from the cross member 140 to which the frame 106 is secured.

In one embodiment, dimensions may be selected to substantially neutralize significant stresses. For example, analyzing the forces that occur in booms 108, an upward force equivalent to half of the total axle load 100 is applied at the cross-beam 140. A moment put into the ends of booms 108 is equivalent to half the total axle load 100, times the horizontal distance 82 between the center of the cross-beam 140 and the load 100. That moment by itself would cause a compressive stress in the top of boom 108 and a tensile stress in the bottom of boom 108. The cylinder 120 pulls on the clevis 126 to induce a compressive stress in boom 108 due to flexure (bending). The combination of these two stresses creates a large compressive stress in the top of the boom 108 and a comparatively smaller tensile stress in the bottom of the boom 108.

By choosing the pivot 116 in such a manner that the cylinder force times the perpendicular distance from the center line of the cylinder to the center of the cross-beam 140 is equal to half the axle load 100 times the horizontal distance from the axle load 100 to the center of cross-beam 140, the moment in the boom 108 can be eliminated. This may effectively reduce the size, and thus the weight, of the boom 108. Even if the distances are not chosen exactly right, the maximum stress in the boom 108 will still be significantly reduced. The reduction in stress may be applied to reduce the material in the boom 108, or increase the life. Even modest reductions in stress may be particularly valuable when fatigue and crack propagation are considered.

Referring to FIG. 8, an internal tank 218 may replace the tank 168. A bulkhead 220 or multiple bulkheads 200, 220 may act as diaphragms 200 within the cross-beam 140. Bushings 220 (similar to, identical to, or different from the bushings 154) may be provided. Accordingly, a conduit 224 may be easily fabricated for delivering lines 202 through any portion of the dogleg 110 desired.

For example, a conduit 224 may pass through a bulkhead 226 on one end of the cross-beam 140, or near one end thereof, by way of an aperture 227. The conduit 224 may thus extend in a continuous, even seamless, contiguity between an upper end 228*a* and a lower end 228*b* of a boom 108. An aperture 230 may remain open in the conduit 224 for threading lines 202 therethrough.

An aperture 232 in each of the booms 108 may be selectively positioned during fabrication to optimized the strength of the boom 108. In construction of vehicles, and aftermarket structures, installers may typically drill holes in any convenient location deemed necessary for threading lines 202. However, small holes may create stress concentrations. Large holes may substantially weaken base materials.

As a practical matter, a conscientious installer may actually do more or less damage by creating a smaller or larger hole, depending on a particular situation and structure. Thus, in an apparatus in accordance with the invention, the location of apertures 232, 226, and the like, may be selected to be consistent with the overall design criteria of the apparatus 10. In one embodiment, an internal tank 218 may be provided with multiple bulkheads 200, 220, 226, providing both air and control lines 202 to the suspension 150.

Figure 9:
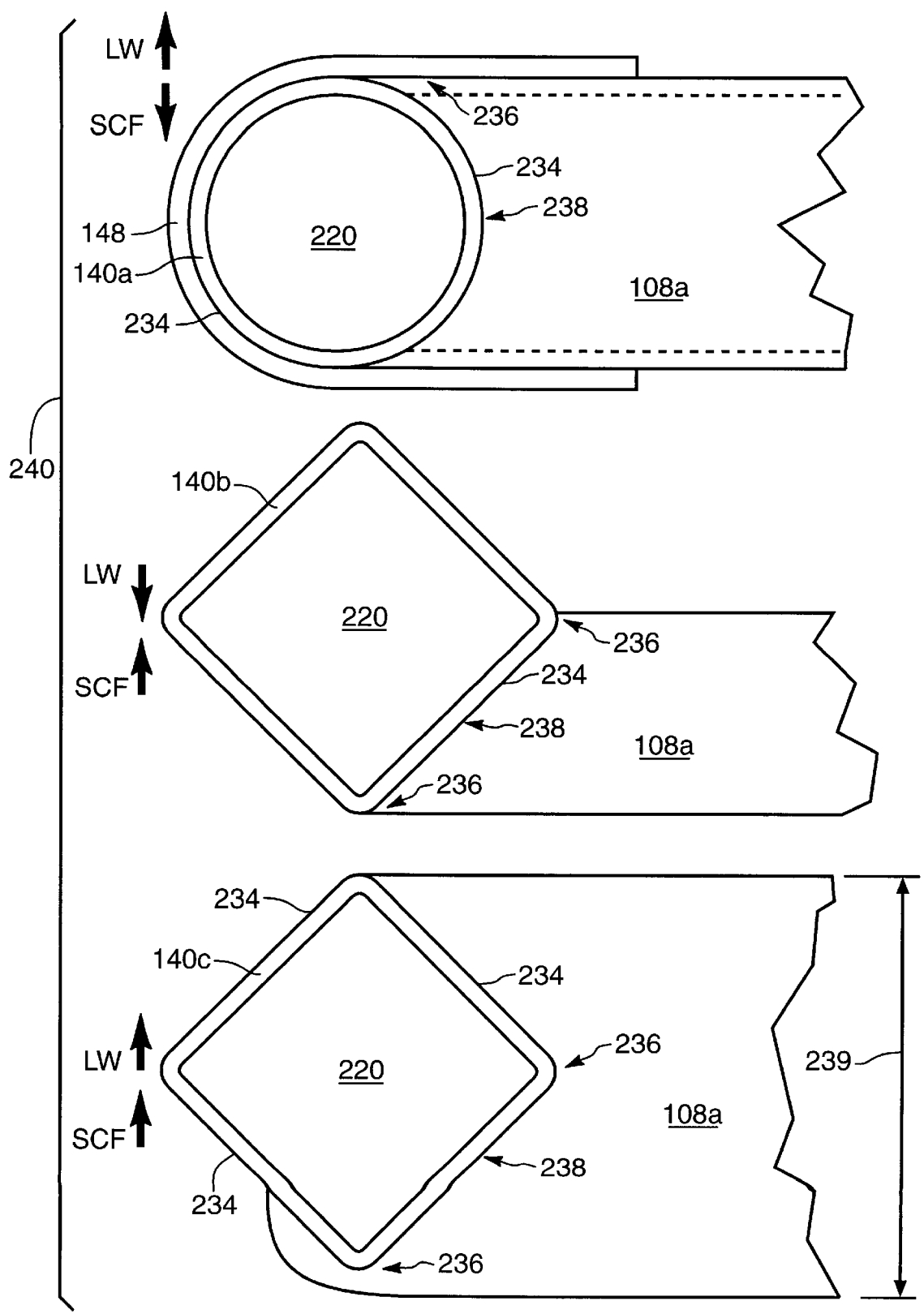
FIG. 9 is a schematic block diagram of various alternative embodiments for the cross-beam in the frame assembly of an apparatus in accordance with the invention, illustrating areas of stress distribution and stress concentration in accordance with alternative construction designs

Referring to FIG. 9, the cross-beam 140, of the frame 108, may be secured in various manners. For example, a cross-beam 140 as a right circular cylinder 140*a* may be secured to an individual boom 108*a* along a weld 238 therebetween. A strap 148 or doubler 148 may extend for any portion of a circumference of the cross-beam 140, and a particular portion of the length of the boom 108*a*.

In one embodiment, a strap 148 may be applied to extend a comparatively short distance away from the corners 236 where the boom 108*a* contacts the cross-beam 140a. Thus, the length of weld, identified in the Figure as LW available to support the forces between the cross-beam 140*a* and the boom 108*a* increases. Meanwhile, the stress concentration factor (represented as SCF) may be substantially reduced. No individual corner 236 is left, even in the middle region 238 with a stress at a corner. Rather, the doubler 148 provides for lengths of weld extending to provide distribution of stress between base materials and welds. Thus, St. Venant's principal operates in favor of reducing stress concentration factors in the overall assembly 108.

By contrast, the rectangular cross section in a cross-beam 140*b* provides corners 236 that may operate as outermost fibers in Flexure. That is, when considering the section modulous of a beam in Flexure, maximum stress occurs at an outermost fiber. Accordingly, the corners 236 may provide stress concentration factors in addition to the design stress, due to changes in material, changes in section, corners, sharp corners, manufacturing failures, porosity of welds, and the like. Accordingly, the stress concentration factor for the cross-beam 140*b* may increase, comparatively. The rectangular cross-section of a cross beam 140 may provide an increase in weight with a minimum improvement in section modulus along the cross-beam 140. Moreover, the length of a weld 234 is substantially less than that available to the cross-beam 148. The effectiveness of the weld 234 may also be substantially reduced. That is, near a neutral axis fiber of a beam, tensile stress from bending is reduced. At the neutral axis, Flexural stress is zero. Loading at the corners 236 reduces much of the benefit of the weld 234 to the cross-beam 140*b*.

Increasing the dimensions of a boom 108*a* to adapt to a cross-beam 140*c* changes the problem. Additional weight will be required in the boom 108 which extends substantially from the vehicle 12. Any change in the depth 239 of a boom 108*a* may be propagated along the entire length of the boom 108*a*. Moreover, the corners 236 may still present stress concentrations. The length of the weld 234 that is effective may be reduced for many of the same reasons as the weld 234 associated with the cross-beam 140*b*. The stress concentration factors that may arise near the corners 236 also may obviate some of the benefit sought by the extending the boom 108*a*. Thus, a cost-effective, lightweight approach for supporting torsion, flexure, and buckling in the cross-beam 140*a* is suggested by the comparison 240.

Manufacturing processes are particularly well suited to the apparatus 10. For example, alignment of the suspension frame 106 with the boom 108 is a simple matter. Moreover, different suspensions 150 may be easily provided under the suspension frame 106. For example, angles 109 and altitudes 113 for the suspension frame 106 may be provided from identical parts by rotation of the frame 106 about the cross-beam 140. Meanwhile, the positioning of the conduits 224 need not be affected. Thus, a late decision may be made as to the exact angle 106 and height 113 or even suspension 150 to be served by a dogleg 110.

Manufacturing tolerances may be accommodated in a jig or fixture for holding all of the parts 108*a*, 108*b*, 140, 144*a*, 144b, and so forth, in the proper relationship during assembly. Meanwhile, the presence of doublers 148, and the like, provides sufficient lengths of welds 234 to distribute stresses through base materials. Redundancy, reduction in stress concentration factors, and the like are provided. Similarly, the doublers 136, 138, may be aligned in appropriate directions for accommodating pivots 116, 114 repeatably within dimensional tolerances, including linear and rotational axes of interest.

From the above discussion, it will be appreciated that the present invention provides conformance of a dogleg 110 to a body 22 or tailgate 24 of virtually any shape desired, including a bubble 30 common to refuse trucks 12. Lengths of welds 234 may be adjusted as desired by the use of suitable doublers 136, 138, 148, and the like adapted to the geometries of components. Safe containment of lines 202 for electricity, air, hydraulic fluid, and the like may be provided. Moreover, aftermarket installation of lines 202 through conduits 224 without obstructions, and without improper perforation of critical structural members is readily available.

Torsional loads are supported by components, particularly the cross-beam 140, while alignment of components becomes readily available. Thus, manufacturing tolerances in individual parts, or created in the individual processes such as punching and drilling of holes, may be accommodated readily in fixtures adapted to position individual components. The compression in the booms 108a, 108b by the cylinders 120 improves the maximum load capacity of the boom 108.

Moreover, rapid, aftermarket or factory installations of brackets 122 may be made to bodies 22, such as on tailgates 24 or elsewhere, without being restricted to the location of a frame 104 of a truck 12. Also, the difficulty of attaching to a frame 104, and the structural damage that may be done by inappropriate fastening may be avoided.

The weight of the auxiliary 20 is positioned much closer to the pivot 34 of the tailgate 24. Accordingly, the hydraulic cylinder 35 or actuator 35 for moving the tailgate 24 need not be increased substantially in order to accommodate the opening of the tailgate 24 at the time of discharge of a load. The wheel position reduces its affection the maximum moment as well as height for the tailgate 24, whether open or closed.

As compared to any other attachment mechanism available in the prior art. Cylinders 120 are resistant to buckling and the abuse from thrown material, such as rocks, when exposed during transit over roads. Corrosion, precision, strengthening, and hardening, requirements may be reduced. Nicks are reduced, which might otherwise destroy seals as well as weaken components 130 of the cylinders 120. Also a much smaller piston rod may be relied upon. The diameter of the piston rod may be much smaller than that of the cylinder. By contrast, prior systems recognize and prefer hydraulic cylinders that extend (push).

By positioning the pivot 114 comparatively high on the tailgate 24, the entire dogleg 110 nestles the tires 19 against the tailgate 24, above 84a the maximum longitudinal 82b extension of the bubble 30. The cross-beam 140, being suitably sized for supporting large lateral 83 loads, is not readily susceptible to buckling, and the diaphragms 200, 220, 226 may be used to reduce susceptibility to local buckling stresses near the attachment of the cross-beam 140 to the booms 108a, 108b.

An additional benefit of the comparatively high location of the pivot 114, is that the auxiliary 20, and particularly the dogleg 110, can be raised for stowage over the bubble 30, without exceeding clearance heights for operation, building access, and low roadway clearances, while also maintaining the maximum truck length within the regulatory limit, such as the 40–45 foot limit imposed by many states on single frame trucks 12. No obstructions are presented to discharge a refuse behind and below the body 22 once the tailgate 24 is opened. Thus, health and operational obstructions are reduced.

The conduit 224 provides a clean appearance, minimum of perforations, no aftermarket perforations, and reduced exposure of critical lines 202 to damage. The air tank 168 may be integrated into the cross-beam 140, lowering weight, improving strength and stiffness thereof, and further reducing susceptibility to damage. Overall cost may also be reduced thereby.

Meanwhile, wheelbase is not sacrificed when needed at a maximum value, nor when needed at a minimum value. Turning radius is actually shortened because the auxiliary should be positioned farther back for weight distribution, while the effect on the overall envelope for operational and regulatory considerations in minimized. The modular configuration of the auxiliary 20 may be adapted to virtually any truck. Moreover, the auxiliary 20 may be adapted to virtually any truck body, with no need to fit or drill a restrictive frame, although that is a possibility.

An ultimate result of the auxiliary 20 is to minimize the negative impact on a factorystock truck 12. At the same time, the auxiliary 20 may virtually double the effective payload that can be legally carried by the truck 12. For example, when the rear axles 16, 18 are fully loaded, the front axle 14 is typically lightly loaded. Thus, the front axle 14 is not obtaining the benefit available to it. By the auxiliary 20 lifting the tailgate 24, and applying a couple to it, the body 22 and truck 12 are pivoted about the rear axles 16, 18, putting additional load on the front axle 14. One may note that a tandem arrangement of the axles 16, 18 may distribute loads equally on those axles 16, 18.

Proper adjustment, at will, by inflating the air bags 180 of the auxiliary 20, will add load to the auxiliary 20 and load to the front axle 14, until each approximates a maximum local load. Thus, rather than having, effectively, two axles of load capacity available, a truck 12 may truly have four axles of load capacity available. With the length 60 between axles 14, 20, providing a maximum distribution of weight beyond the wheelbase 60, within the overall envelope permitted, for the length of the truck 12, payloads may be increased substantially.

Considering that the vehicle 12 is itself tare weight, yet contributes to the maximum allowable weight on all axles 14, 16, 18, 20, one may see that the legal limit on the weight of the truck 12 need not be doubled, with the addition of a single axle 20. Nevertheless, due to inherent inefficiencies without the auxiliary 20, the true value of the rated capacity of the axle 14 may be loaded on the truck 12, in addition to the rated load allocated to the auxiliary 20. Since this affects payload more dramatically than the overall weight, the load may be effectively doubled in certain instances for the vehicle 12 supported by the body 22 when the auxiliary 20 is deployed. Each axle can be loaded at its maximum permissible value.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An apparatus for attachment to a vehicle having a rigid body, the apparatus comprising:
   a boom pivotable between a stowed position and a deployed position;
   a mounting bracket for pivotably attaching the boom to the vehicle, the vehicle having longitudinal, lateral, and transverse directions;
   an actuator, pivotably connected between a distal end of the boom and the vehicle, forming, a triangular geometry therewith and adapted to draw the distal end, toward the vehicle;
   a frame rigidly secured to the boom to extend therefrom at a fixed angle with respect thereto selected for fitting around a protrusion extending from the rear of the vehicle;
   an axle connected to the frame and adapted to receive road wheels for supporting the vehicle on a road surface; and
   a suspension system configured to provide transverse travel of the axle with respect to the frame.

2. The apparatus of claim 1 where the mounting bracket is adapted to be attached to the body of the vehicle.

3. The apparatus of claim 2, wherein the mounting bracket is further adapted to be secured to a tailgate associated with the body to be rigidly fixed with respect to and to move with the tailgate.

4. The apparatus of claim 1, further comprising another boom, actuator, and bracket corresponding to the boom, actuator and bracket, and connected thereto by a cross-beam fixed to extend laterally between the distal ends of the boom and other boom.

5. The apparatus of claim 4, wherein the actuator and other actuator comprise hydraulic pistons.

6. The apparatus of claim 1, wherein the suspension system further comprises casters for securing the wheels to the axle and for casting in a substantially longitudinal-lateral plane.

7. The apparatus of claim 6, wherein the suspension system is configured to provide castor and camber for facilitating turns made by the truck.

8. The apparatus of claim 7, wherein the castor and camber are configured to reduce the turning radius of the vehicle for facilitating sharp turns.

9. The apparatus of claim 4, further comprising means for fastening the frame to the cross-beam, disposing the frame at an angle selected with respect to the boom to minimize a profile of the apparatus in the stowed position.

10. The apparatus of claim 9, further comprising a bumper frame adapted to extend from the frame for providing an obstruction extending laterally at a location longitudinally positioned behind the axle to be effective to meet regulatory requirements on the apparatus in the deployed position.

11. The apparatus of claim 10, wherein the bumper frame is provided with a lateral member positioned substantially parallel to a surface supporting the wheels and corresponding to a height in conformity with regulation when the wheels engage the surface.

12. The apparatus of claim 11, wherein the bumper is adapted to provide clearance indicators selectively actuable by an operator for conforming to a regulatory standard arbitrarily selected independent from a structural design of the apparatus.

13. The apparatus of claim 1, wherein the boom further comprises left and right boom members and a cross-beam extending between a distal end of the left boom member and a distal end of the right boom member and is provided with shear plates positioned therein proximate the left and right boom members respectively, for supporting the cross-beam against torsional loads induced therein by operation of the apparatus.

14. The apparatus of claim 13, further comprising a conduit adapted to extend through the boom in a substantially longitudinal direction, extending substantially continuously therefrom through an aperture in a shear plate to extend laterally, with respect to the apparatus, through a portion of the length of the cross-beam, to be protected thereby, for containing control lines.

15. The apparatus of claim 14, wherein the lines are selected from a group consisting of electrical lines, pneumatic lines, and hydraulic lines.

16. The apparatus of claim 15, wherein the lines are selected to carry signals effective to operate control mechanisms for effecting the operation of the apparatus.

17. The apparatus of claim 16, wherein the control mechanisms are selected from the group consisting of brake controls, suspension controls, and hydraulic actuation controls.

18. The apparatus of claim 1 wherein the apparatus is adapted to be secured exclusively to a tailgate of the body to move therewith in a substantially rigid-body motion in a stowed position.

19. The apparatus of claim 18, wherein the vehicle has a tailgate having an open position and a closed position and the apparatus is further adapted, in vehicle stowed position; to be completely clear from all space behind the rear of the body of the vehicle.

20. The apparatus of claim 1, wherein the apparatus is further adapted to be operatively attached to the vehicle for selective deployment and stowage thereon and effective to load a front axle of the vehicle from the deployed position, and wherein the vehicle is selected from a refuse-handling truck, a dump truck, an automatic-loading refuse-handling truck, a front-top-loading refuse truck, and a side-loading-refuse-handling truck.

21. An apparatus for attachment to a vehicle movable along a surface, the apparatus comprising:
   a boom configured to be attached behind the vehicle to be pivotable between a stowed position and a deployed position;
   a mounting bracket for pivotably attaching the boom to the vehicle, the vehicle having longitudinal, lateral, and transverse directions;
   an actuator, pivotably connected between the boom and the vehicle and to draw the boom downward toward the surface and configured to absorb comparatively large deflections incident to travel;
   a frame rigidly secured to the boom to extend therefrom at a fixed angle with respect thereto selected for fitting around a protrusion extending from the rear of the vehicle,
   an axle disposed in relation to the boom and adapted to receive road wheels for supporting the vehicle on the surface; and
   a suspension system adapted to provide transverse travel of the axle with respect to the boom and configured to absorb comparatively small deflections incident to travel.

\* \* \* \* \*

UNITED STATES PATENT AND TRADEMARK OFFICE
CERTIFICATE OF CORRECTION

PATENT NO. : 6,189,901 B1
DATED : February 20, 2001
INVENTOR(S) : Fred P. Smith et al.

It is certified that error appears in the above-identified patent and that said Letters Patent is hereby corrected as shown below:

<u>Title page,</u>
Add: Wilbur Dejong as an inventor

Signed and Sealed this

First Day of January, 2002

Attest:

Attesting Officer

JAMES E. ROGAN
*Director of the United States Patent and Trademark Office*